(12) United States Patent
Coleman et al.

(10) Patent No.: US 8,073,013 B2
(45) Date of Patent: Dec. 6, 2011

(54) METHOD AND APPARATUS FOR COLLECTING SURVEY DATA VIA THE INTERNET

(75) Inventors: Jon Coleman, Chapel Hill, NC (US); Carl Barringer, Driggs, ID (US); William J. Fugina, Brooklyn, NY (US)

(73) Assignee: Coleman Research, Inc., Morrisville, NC (US)

( * ) Notice: Subject to any disclaimer, the term of this patent is extended or adjusted under 35 U.S.C. 154(b) by 1470 days.

(21) Appl. No.: 11/365,446

(22) Filed: Mar. 1, 2006

(65) Prior Publication Data

US 2007/0206606 A1    Sep. 6, 2007

(51) Int. Cl.
| | |
|---|---|
| *H04J 1/00* | (2006.01) |
| *H04H 60/33* | (2008.01) |
| *H04H 60/32* | (2008.01) |
| *H04N 7/173* | (2006.01) |
| *G06Q 30/00* | (2006.01) |

(52) U.S. Cl. .............. 370/486; 725/13; 725/16; 725/24; 705/14.41

(58) Field of Classification Search .................. 370/310, 370/312, 464, 484, 485, 486, 480; 704/200, 704/231; 705/1, 7, 10, 14, 14.41; 709/223, 709/224, 230, 231; 702/127, 179; 725/9–25

See application file for complete search history.

(56) References Cited

U.S. PATENT DOCUMENTS

| | | | |
|---|---|---|---|
| 4,546,382 A | 10/1985 | McKenna et al. | |
| 4,658,290 A | 4/1987 | McKenna et al. | |
| 4,816,904 A | 3/1989 | McKenna et al. | |
| 4,905,080 A | 2/1990 | Watannabe et al. | |
| 5,374,951 A | 12/1994 | Welsh | |
| 5,726,701 A * | 3/1998 | Needham | 725/105 |
| 5,872,588 A | 2/1999 | Aras et al. | |
| 6,202,210 B1 | 3/2001 | Ludtke | |
| 6,295,092 B1 | 9/2001 | Hullinger et al. | |
| 6,493,327 B1 | 12/2002 | Fingerhut | |
| 6,567,767 B1 | 5/2003 | Mackey et al. | |
| 6,681,393 B1 | 1/2004 | Bauminger et al. | |
| 6,704,929 B1 | 3/2004 | Ozer et al. | |
| 6,708,335 B1 | 3/2004 | Ozer et al. | |
| 2001/0027410 A1 | 10/2001 | Ueda | |
| 2001/0032115 A1 * | 10/2001 | Goldstein | 705/10 |
| 2002/0007303 A1 * | 1/2002 | Brookler et al. | 705/10 |
| 2002/0055876 A1 * | 5/2002 | Gabler | 705/14 |
| 2002/0072955 A1 | 6/2002 | Brock | |
| 2002/0082900 A1 | 6/2002 | Johnson | |
| 2002/0138262 A1 * | 9/2002 | Kroeker et al. | 704/231 |

(Continued)

OTHER PUBLICATIONS extrapolation. (1992). In Academic Press Dictionary of Science and Technology. Retrieved from http://www.credoreference.com/entry/apdst/extrapolation.*

(Continued)

*Primary Examiner* — Ricky Ngo
*Assistant Examiner* — Paul Masur
(74) *Attorney, Agent, or Firm* — Coats & Bennett, P.L.L.C.

(57) ABSTRACT

A method and apparatus for conducting a survey independent of location and participant schedules is disclosed herein. An exemplary method of the present invention comprises sending a multi-media data file to a plurality of survey participants, receiving reactionary feedback from a plurality of participants via a wide area network, and compiling the reactionary feedback to generate the survey results. Subsequently, a viewer synchronously displays the compiled survey results with the corresponding streamed media from the multi-media data file.

30 Claims, 8 Drawing Sheets

U.S. PATENT DOCUMENTS

| | | | |
|---|---|---|---|
| 2002/0152110 A1* | 10/2002 | Stewart et al. | 705/10 |
| 2002/0174425 A1* | 11/2002 | Markel et al. | 725/13 |
| 2002/0178441 A1* | 11/2002 | Hashimoto | 725/11 |
| 2003/0046140 A1 | 3/2003 | Callahan et al. | |
| 2003/0126010 A1 | 7/2003 | Barns-Slavin | |
| 2003/0172374 A1* | 9/2003 | Vinson et al. | 725/9 |
| 2003/0182135 A1* | 9/2003 | Sone | 705/1 |
| 2003/0236906 A1* | 12/2003 | Klemets et al. | 709/231 |
| 2004/0021685 A1* | 2/2004 | Denoue et al. | 345/721 |
| 2004/0059597 A1 | 3/2004 | Tkaczyk et al. | |
| 2004/0098478 A1 | 5/2004 | Koetke et al. | |
| 2004/0117480 A1* | 6/2004 | Karaoguz et al. | 709/224 |
| 2004/0148219 A1* | 7/2004 | Norris, III | 705/10 |
| 2005/0028005 A1 | 2/2005 | Carson et al. | |
| 2005/0262237 A1 | 11/2005 | Fulton et al. | |
| 2006/0053058 A1* | 3/2006 | Hotchkiss et al. | 705/14 |
| 2006/0064341 A1* | 3/2006 | Frengut et al. | 705/10 |
| 2006/0107195 A1* | 5/2006 | Ramaswamy et al. | 715/500.1 |
| 2006/0136960 A1* | 6/2006 | Morris | 725/13 |
| 2006/0155513 A1* | 7/2006 | Mizrahi et al. | 702/179 |
| 2006/0248188 A1* | 11/2006 | Nickerson et al. | 709/224 |
| 2007/0214471 A1* | 9/2007 | Rosenberg | 725/24 |

OTHER PUBLICATIONS http://www.survey.com/products/dwnld.html, survey.com products and services, Creative Testing.

http://www.survey.com/products/dwnld.html, survey.com products and services, Audio and Video Online Testing.

\* cited by examiner

| POSITION | TIME (SEC) |
|---|---|
| 50 | 0 |
| 61 | 12 |
| 65 | 13 |
| 68 | 14 |
| 45 | 20 |
| 40 | 21 |
| 36 | 27 |
| 31 | 28 |

RAW DATA

| POSITION | TIME (SEC) |
|---|---|
| 50 | 0 |
| 50 | 1 |
| 50 | 2 |
| 50 | 3 |
| 50 | 4 |
| 50 | 5 |
| 50 | 6 |
| 50 | 7 |
| 50 | 8 |
| 50 | 9 |
| 50 | 10 |
| 50 | 11 |
| 61 | 12 |
| 65 | 13 |
| 68 | 14 |
| 68 | 15 |
| 68 | 16 |
| 68 | 17 |
| 68 | 18 |
| 68 | 19 |
| 45 | 20 |
| 40 | 21 |
| 40 | 22 |
| 40 | 23 |
| 40 | 24 |
| 40 | 25 |
| 40 | 26 |
| 36 | 27 |
| 31 | 28 |
| 31 | 29 |
| 31 | 30 |

EXTRAPOLATED REACTIONARY FEEDBACK

METHOD AND APPARATUS FOR COLLECTING SURVEY DATA VIA THE INTERNET

BACKGROUND

This invention relates generally to surveys, and more particularly to multi-media surveys.

Multi-media surveys provide statistical information regarding the average response to multi-media segments, such as music programming, television programming, advertisements, political messages, etc. Based on this information, radio stations, television networks, and other organizations may adjust multi-media content according to desired business goals. For example, based on the results of a multi-media survey, a television network may adjust the content of future news programs to increase the numbers of viewers, a radio station may adjust a play list to increase the number of listeners, a politician may adjust a political message to appeal to a broader range of voters, etc.

Conventionally, conducting a multi-media survey requires gathering a group of participants in a central location, such as an auditorium. During the survey, each participant manipulates a mechanical device while viewing and/or listening to a multi-media segment. In so doing, the participants indicate their reactions to the content in the multi-media segment. While such conventional surveys provide the desired survey information, they have inherent problems. First, conventional multi-media surveys are expensive due to the high costs associated with renting an auditorium and setting up all of the survey equipment. In addition, the effort associated with arranging for all participants to take the survey at the same time in the same location is time consuming and inflexible. These cost and schedule considerations often limit the amount of survey data that can be collected, which in turn limits the usefulness of the survey.

SUMMARY

The present invention provides a method and apparatus for conducting a survey that is independent of location and participant schedules. An exemplary method of the present invention comprises sending a multi-media data file to a plurality of survey participants, receiving reactionary feedback from a plurality of participants via a wide area network, and compiling the reactionary feedback to generate the survey results.

According to one exemplary embodiment, a personal communication device streams media from the received multi-media data file to a user interface and records the participant's reactionary feedback to the streamed media, where the reactionary feedback is synchronized with the streamed media. Subsequently, the personal communication device uploads the reactionary feedback to a network server via the wide area network, where a network gateway associates the received reactionary feedback with the corresponding participant. A study manager then compiles the reactionary feedback to generate the survey results.

DETAILED DESCRIPTION

Figure 1:
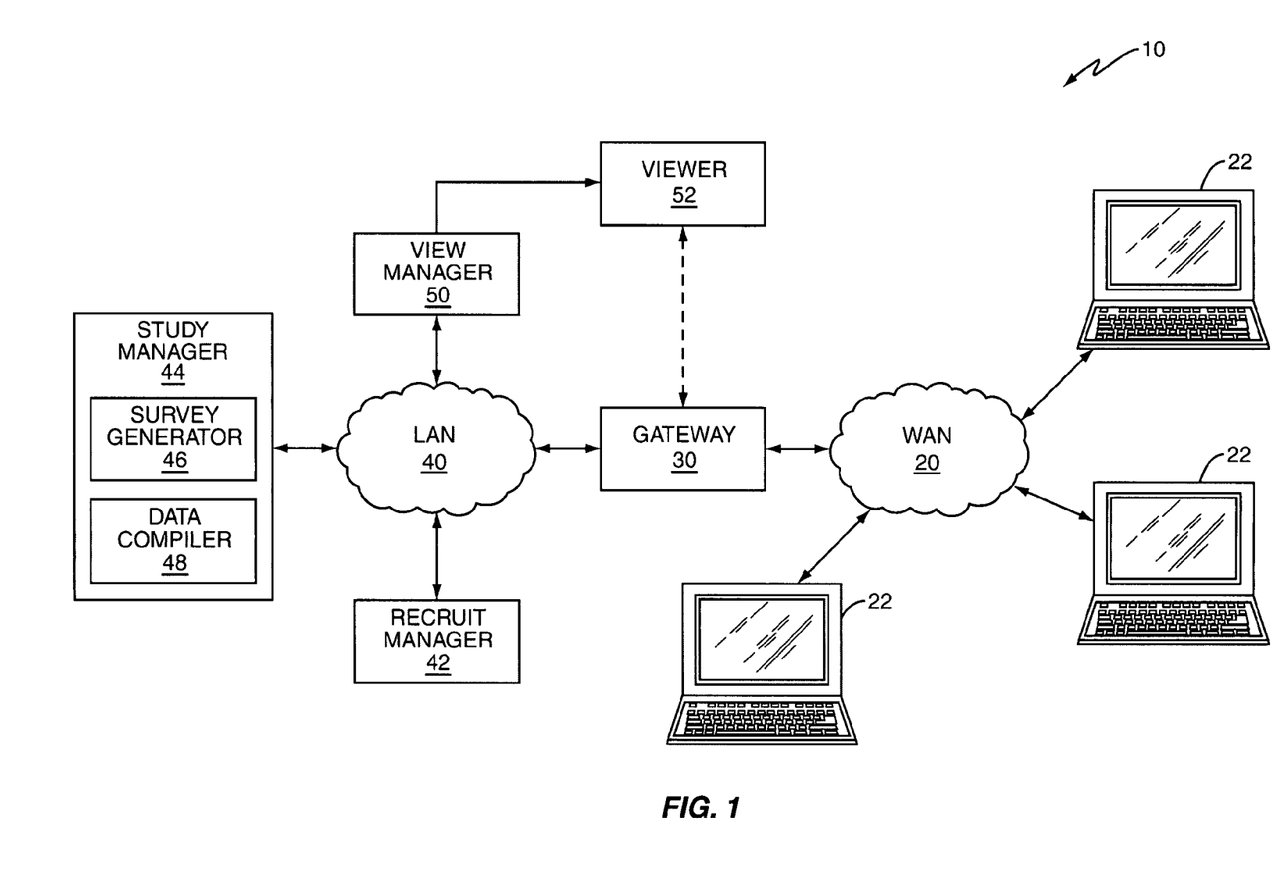
FIG. 1 illustrates a communication network for implementing a multi-media survey according to an exemplary embodiment of the present invention.

FIG. 1 illustrates an exemplary communications network 10 appropriate for conducting a multi-media survey according to the present invention. Communications network 10 includes a Wide Area Network (WAN) 20 connected to a Local Area Network (LAN) 40 via a gateway 30. WAN 20 comprises a publicly accessible system of interconnected computer networks, including personal computers 22, that transmit voice and packet data using one or more standardized communication protocols. The most common example of a WAN is the Internet. While the following describes the present invention in terms of the Internet, those skilled in the art will appreciate that the present invention applies to any WAN 20. Further, while the following describes the invention in terms of personal computers 22 connected to WAN 20, those skilled in the art will appreciate that the invention applies to any wired or wireless personal communication device that connects to WAN 20, such as a personal computer, laptop, mobile telephone, personal data assistant, etc.

LAN 40 interconnects one or more computers and/or computer networks located in a relatively small geographical area, and includes a relational database management system, such as a SQL server 42. While the present invention is described herein in terms of a SQL server 42, those skilled in the art will appreciate that the SQL server 42 may be replaced with any known database server.

According to the present invention, LAN 40 interconnects multiple survey managers, such as recruit manager 42, study manager 44, and viewer manager 50, according to any means known in the art. In so doing, LAN 40 facilitates communications between the different survey managers. Generally, recruiting manager 42 identifies potential survey participants, study manager 44 defines the survey and compiles survey results, and viewer manager 50 controls an interactive survey viewer 52, which displays the compiled survey results. The following discusses additional details regarding these different survey managers. While FIG. 1 illustrates the survey managers as separate components interconnected by LAN 40, those skilled in the art will appreciate that one or more survey managers may be co-located on a single network device. Further, while FIG. 1 illustrates a viewer 52 co-located with a view manager 50, those skilled in the art will appreciate that view manager 50 and viewer 52 may be separate components. In addition, those skilled in the art will appreciate that one or more survey managers may connect to WAN 20.

As shown in FIG. 1, WAN 20 and/or LAN 40 may optionally include a media server 44. The media server 44 in WAN 20 may stream media, such as audio and/or video media, to one or more personal computers 22. In addition, the media server 44 in LAN 40 may stream media to viewer 52 in view manager 50.

Figure 2:
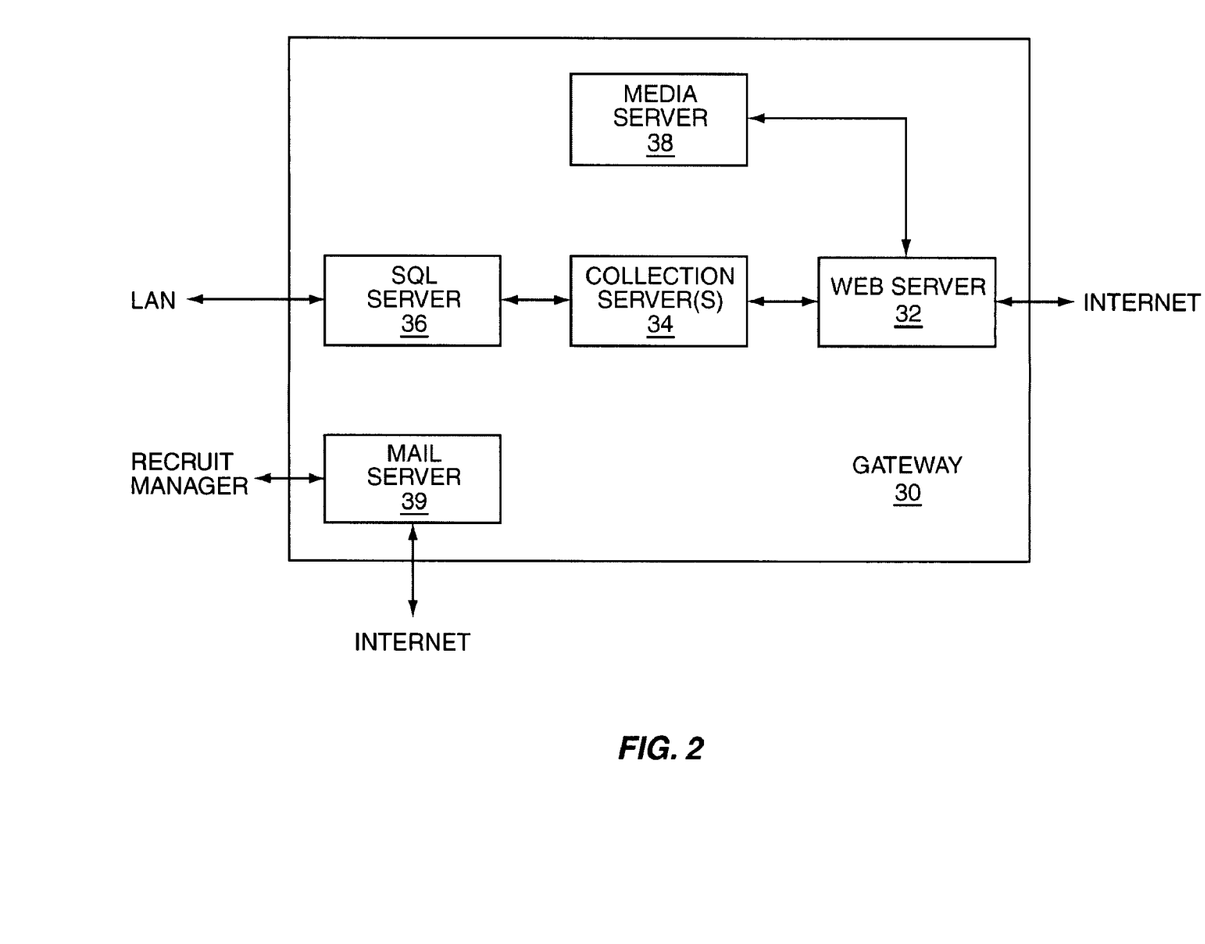
FIG. 2 illustrates an exemplary gateway for the communication network of FIG. 1.

Gateway 30 interfaces LAN 40 with Internet 20. FIG. 2 illustrates an exemplary gateway 30 according to the present invention. Gateway 30 includes a web server 32 and one or more collection servers 34. Web server 32 exchanges data with communication devices connected to the Internet 20 according to any means known in the art, while collection server(s) 34 dynamically establish one or more interfaces between the SQL server 42 or any other database server in the LAN 40 and the web server 32, as discussed further below.

Gateway 30 may also include a mail server 36. Mail server 36 interfaces the Internet 20 and the recruit manager 42 according to any means known in the art. Using the interface created by mail server 36, recruit manager 42 may communicate with one or more personal computers 22 using any form of electronic communications, such as email, instant messaging, etc.

Conducting a survey according to the present invention includes using the interconnected network components shown in FIG. 1 to recruit a plurality of participants, collect reactionary feedback from multiple participants, and compile/display the survey results. In an exemplary embodiment, recruiting manager 42 recruits and selects the survey participants and study manager 44 generates the survey during the recruiting phase. During the collecting phase, selected participants execute the survey on a personal computer 22 connected to the Internet 20 at any convenient time. During the survey, each participant synchronizes a reaction with the streamed media by manipulating a reaction tool associated with personal computer 22 while viewing and/or listening to the streamed media. Personal computer 22 stores the reactionary feedback and uploads the reactionary feedback to gateway 30 via the Internet 20 to complete the collecting phase. During the results phase, one or more collection servers 34 in gateway 30 work with the study manager 44 to compile the reactionary feedback and to generate the survey results for one or more surveys, while the viewer manager 50 formats and displays the survey results on viewer 52. The following references FIGS. 3-8 while describing each of these phases in further detail.

Figure 3:
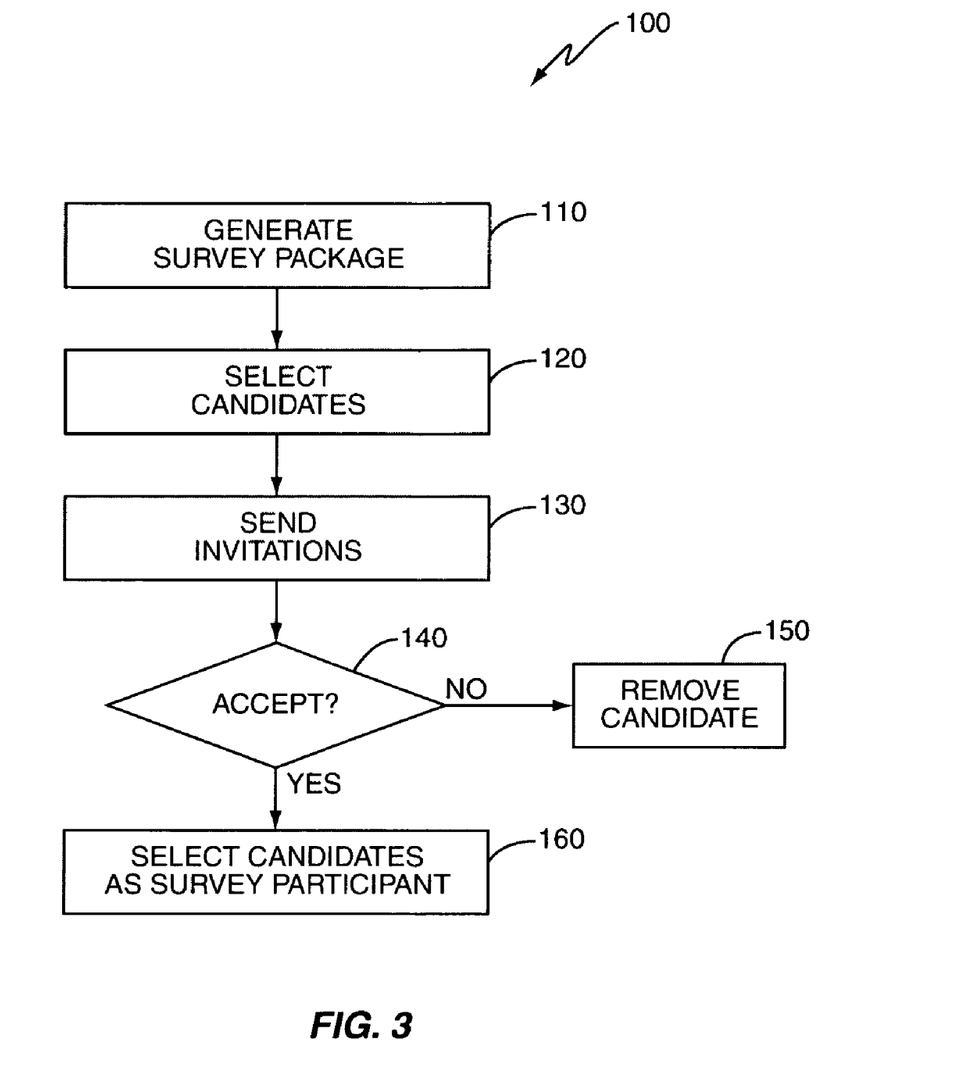
FIG. 3 illustrates a recruiting process according to an exemplary embodiment of the present invention.

FIG. 3 illustrates an exemplary recruiting process 100 for the recruiting phase according to the present invention. During the recruiting phase, survey generator 46 generates a survey package (block 110) by, for example, defining the survey multi-media, defining the type of reaction tool, generating one or more survey questions, generating the corresponding survey software, etc. In one exemplary embodiment, the defined survey multi-media includes time markers that facilitate the synchronization of the survey results with the multi-media, as discussed further below. The resulting survey package comprises survey software and any other survey materials necessary for conducting the survey. In some embodiments, the survey package may also include a multi-media data file that stores the survey multi-media. While FIG. 3 illustrates that the survey package is generated first in recruiting process 100, those skilled in the art will appreciate that the survey package may be generated at any time during the recruiting process 100, and may alternatively be generated before or after the recruiting process 100.

Recruiting manager 42 selects survey candidates (block 120) according to any known means. For example, recruiting manager 42 may select a plurality of male and female survey candidates between the ages of 16 and 65 and living in a metropolitan area to participate in a survey for a television station local to the metropolitan area. Recruiting manager 42 generates and sends invitations to each selected candidate via mail server 36 (block 130) using email, instant messaging, or any other type of electronic communication. When a candidate declines the invitation (block 140), recruiting manager 42 removes the declining candidate from the list (block 150). However, when a candidate accepts the invitation (block 140), recruiting manager 42 identifies the accepting candidate as a survey participant (block 160).

Subsequently, the survey package generated by survey generator 46 is sent to each identified participant according to any known means. For example, recruiting manager 42 may send an email to one or more survey participants via mail server 36, where the email includes the survey package as an attachment or where the email directs the survey participant to download the survey package from a specified web page. Alternatively, the contents of the survey package may be saved onto a portable storage medium, such as a CD, DVD, etc., and mailed to one or more survey participants via conventional land mail.

After a participant receives the survey package, the participant may set up and participate in the survey at any convenient location and time. To that end, the participant loads the survey software provided by the survey package onto a personal computer 22 that can connect to the Internet 20. At a convenient time, the participant takes the survey by running the survey software on personal computer 22.

Figure 4:
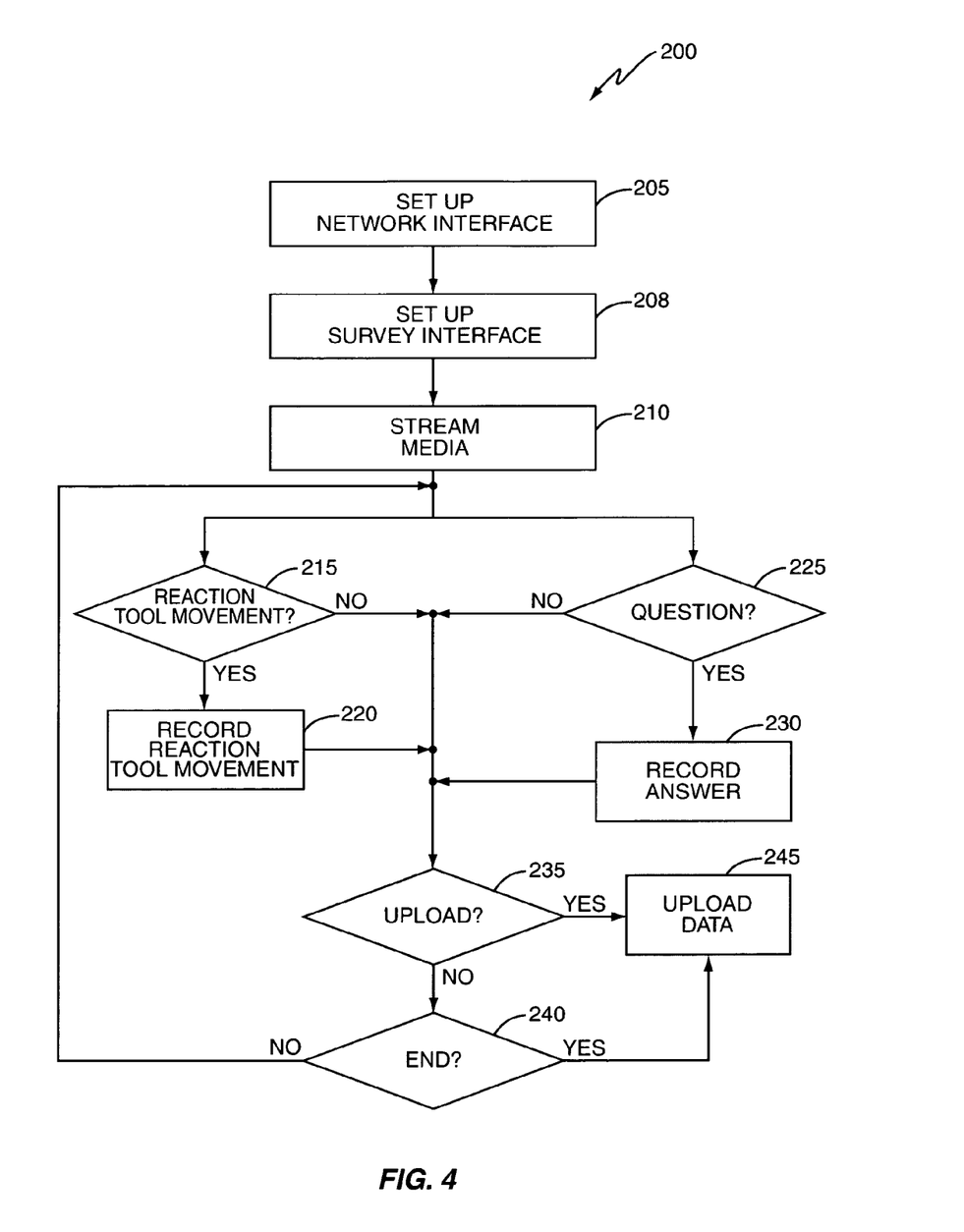
FIG. 4 illustrates a survey process according to an exemplary embodiment of the present invention.

FIG. 4 illustrates a collecting process 200 for the collecting phase according to one embodiment of the present invention. When a participant is ready to take the survey, the participant's personal computer 22 sends a command to gateway 30 via the Internet 20 to set up a network interface between SQL server 42 and web server 32 using a collection server 34 for the particular participant (block 205). In particular, collection server 34 initiates a survey based on information from web server 32, such as credentials received from the participant. Collection server 34 then gathers survey information details from SQL server 42 and provides the survey information details to web server 32. As reactionary feedback is collected from the participant by the web server 32, the collection server 34 processes the web server data and stores it on the SQL server 42.

The personal computer also sets up a survey interface 60 on a monitor of the personal computer 22 (block 208). Survey interface 60 interfaces the participant with the survey software, enabling the survey software to collect background information, such as gender, age, etc., and reactionary feedback during the collecting phase.

After the network and survey interfaces are set up, personal computer 22 streams media from a multi-media data file to a user interface of the personal computer (block 210). For example, responsive to instructions provided by the survey software, personal computer 22 may stream an audio segment to speakers of the personal computer 22, a video segment to the survey interface 60, etc. In one exemplary embodiment, personal computer 22 streams media from a multi-media data file stored in the memory of the personal computer 22. In another exemplary embodiment, the multi-media data file is stored on the network, and the personal computer 22 streams media from media server 44 via the Internet 20. While personal computer 22 streams the media, the participant provides reactionary feedback. The participant may provide the reactionary feedback by manipulating a reaction tool on the survey interface 60 (blocks 215 and 220). Once the survey is complete, personal computer 22 uploads the data to gateway 30 via Internet 20 (blocks 240 and 245). Alternatively, personal computer 22 may periodically upload the data during the survey. In some embodiments, the periodic uploading may require pausing the streamed multi-media (block 242), uploading the data (block 245), and then resuming the media stream (block 248). However, it will be appreciated that not all embodiments require the pause and resume steps.

In addition to providing reactionary feedback, the participant may answer questions posed during the survey (blocks 225, 230, and 232). The questions may be posed simultaneously with the streamed media or may interrupt the streamed media. In addition, the questions may be posed via survey interface 60 and/or via speakers associated with the personal computer 22. The questions may be pre-programmed into the survey software to occur at specific times during the survey. Alternatively or in addition, the survey software may pose questions responsive to the participant's reactionary feedback, e.g., responsive to dramatic reactionary feedback, responsive to no reactionary feedback, responsive to unexpected reactionary feedback, etc. In either case, the participant may answer the questions by typing the answer into a keyboard, selecting the answer from a group of choices displayed on survey interface 60 using an interface tool, and/ or providing audio input. The survey software records the answers to any posed questions and synchronizes the recorded answers with the media file as necessary (block 230). Once the participant provides the answers to the questions, the survey software resumes streaming the multi-media (block 232). Like the reactionary feedback, the answers to the questions may be periodically uploaded during the survey (blocks 235, 242, 245, and 248) or may be uploaded after the survey is complete (blocks 235, 240, and 245).

Figure 5:
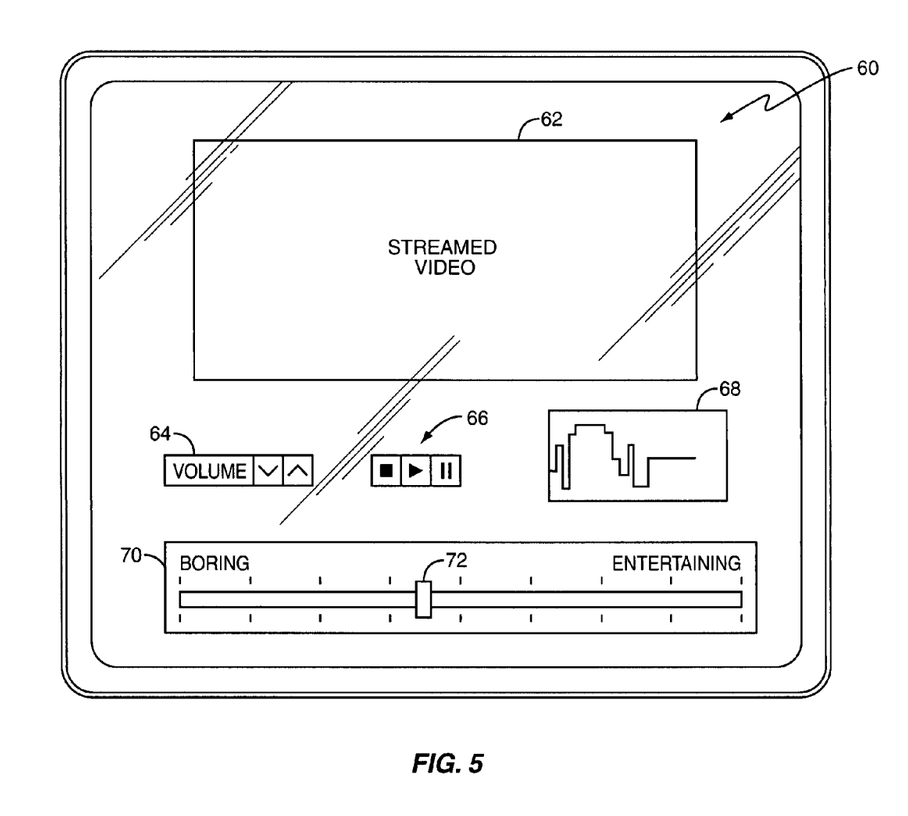
FIG. 5 illustrates a reaction tool according to an exemplary embodiment of the present invention.

As discussed above, survey interface 60 interfaces the participant with the survey software during the collecting phase. FIG. 5 illustrates one exemplary survey interface 60 according to the present invention. Survey interface 60 includes a reaction feedback thumbnail 68 for showing reaction feedback status during the collecting phase, various media controls, such as a volume controller 64 and media stream controllers 66, and a reaction tool, such as a slider bar 70. In addition, survey interface 60 may optionally include a video section 62 for displaying streamed video. Media stream controllers 66 enable the participant to control the streamed media. In particular, media stream controllers 66 enable the participant to start, pause, stop, or even replay the streamed media. Controlling the streamed media in this manner enables the participant to participate in the survey at any convenient time, and even enables the participant to break the survey up into segments that may be taken at different times.

While viewing and/or listening to the streamed media, the participant manipulates the reaction tool to provide reactionary feedback. As used herein, the term reaction tool means any input device that quantifies the participant's reaction to the streamed media responsive to user input. According to one exemplary embodiment, the reaction tool is a graphical user interface (GUI) control displayed on a monitor that may be manipulated using any appropriate user interface device, including a mouse, keyboard, stylus, etc. FIG. 5 illustrates an exemplary reaction tool, referred to herein as slider bar 70. The participant manipulates a slider control 72 on slider bar 70 using a mouse, keyboard, stylus, or other user interface tool. By moving slider control 72 left and right, the participant provides reaction information relative to the streamed media, such as how boring or entertaining the streamed media is. The reaction information quantifies the reaction of the participant to the streamed media by corresponding a position of the reaction tool to the reaction of the participant while the participant moves the reaction tool.

While FIG. 5 illustrates that survey interface 60 includes a single slider bar 70, those skilled in the art will appreciate that survey interface may include additional reaction tools so that a participant may record additional reactions to the streamed media. For example, additional reaction tools may enable the participant to indicate how happy/sad, motivated/un-motivated, etc., the streamed media makes the participant feel. In addition, while the present invention is described in terms of slider bar 70, those skilled in the art will appreciate that other types of reaction tools may be used. For example, the reaction tool may comprise any type of GUI control, including a displayed dial, arrows, etc., or may comprise any type of hardware device.

In any event, when the participant manipulates slider control 72, the survey software records the position of the slider control 72 and records a corresponding time marker, where the recorded time marker represents the time of the slider control movement relative to a predetermined time reference, such as the beginning of the streamed media. If the participant continuously moves slider control 72, the survey software periodically records a slider control position and a corresponding time marker. For example, the survey software may record a slider control position and a corresponding time marker every n seconds when the participant continuously moves slider control 72. By recording the time marker corresponding to the recorded slider control position, the survey software synchronizes the participant's reactionary feedback with the streamed media. While the survey software may record position information for each time increment, i.e., for each second of the streamed media, the survey software may be designed to only record time and position data when the slider control 72 is moving; when the slider control 72 is not moving, no data is recorded. In so doing, the survey software conserves memory and reduces the amount of data to be uploaded.

To collect the reactionary feedback from the survey participants, each participant's personal computer 22 uploads the reactionary feedback to gateway 30 via the Internet 20. The survey software may control a personal computer 22 to periodically upload the reactionary feedback during the survey, as shown in blocks 235 and 245 of FIG. 4. Alternatively, the survey software may store the reactionary feedback in memory circuits in the personal computer 22 and upload all reactionary feedback after the completion of the survey, as shown in blocks 235, 240, and 245 of FIG. 4.

Once uploaded, web server 32 provides the data from multiple participants and/or multiple surveys to collection server (s) 34. The collection server(s) 34 associate the incoming reactionary feedback with a particular participant and a particular survey. For example, the collection server(s) 34 convert the incoming reactionary feedback to normalized relational data and stores the normalized relational data on SQL server 42, as discussed further below. Collection server(s) 34 then provide the participant and survey specific reactionary feedback to the SQL server 42 in LAN 40, which serves as a repository for the reactionary feedback.

Figure 6:
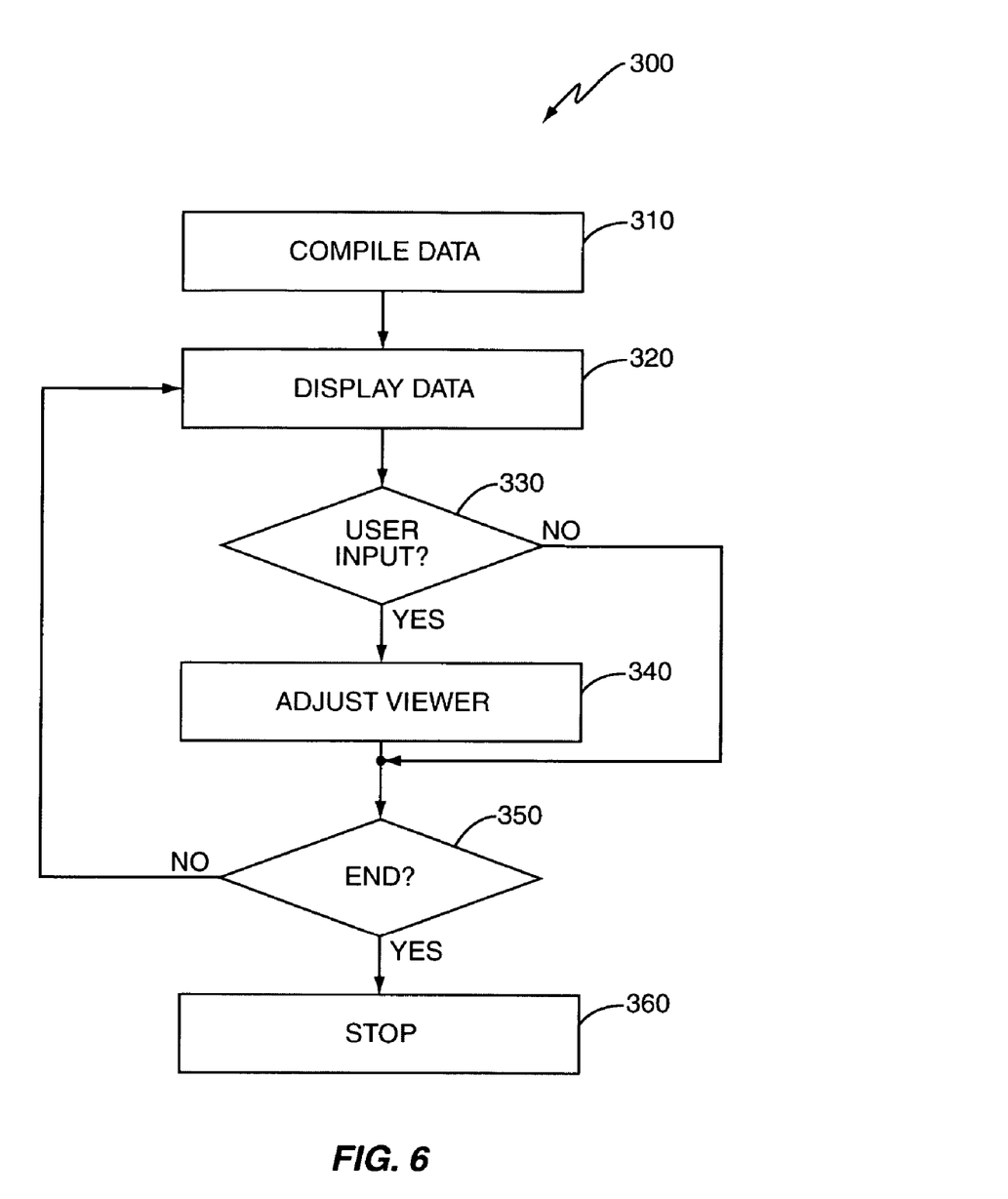
FIG. 6 illustrates a process for compiling and displaying the survey results according to an exemplary embodiment of the present invention.

When a sufficient number of participants have completed a survey, study manager 44 and viewer manager 50 implement the results phase. FIG. 6 illustrates one exemplary process 300 for implementing the results phase for a particular survey. Generally, after retrieving the reactionary feedback from a plurality of participants for a particular survey from SQL server 42, a data compiler 48 in study manager 44 compiles the reactionary feedback to generate the survey results for the survey (block 310). Subsequently, viewer manager 50 formats the survey results and controls viewer 52 to display the survey results according to a user-specified configuration (blocks 320-340).

To compile the survey data, data compiler 48 first analyzes the reactionary feedback of each survey participant to determine if each participant's reactionary feedback includes a slider control position for each desired time increment, i.e., for each 1 second time increment. Because position and time data are not recorded during some portions of the survey, as discussed above, a participant's reactionary feedback may not include a slider control position for some time increments. To generate a complete set of reactionary feedback for each participant, data compiler 48 converts the received reactionary feedback data to normalized reaction data by, for example, extrapolating the received reactionary feedback for each survey participant.

Figure 7:
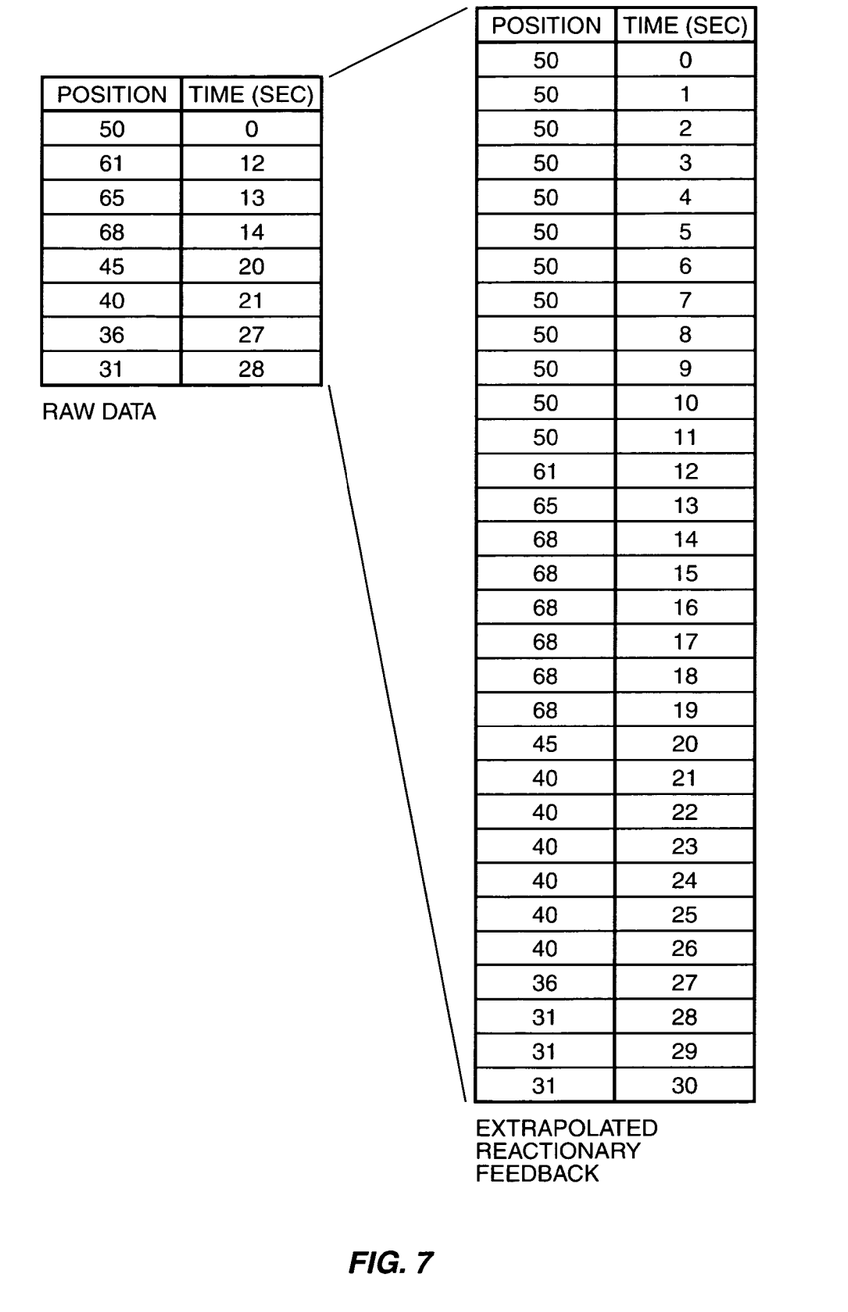
FIG. 7 illustrates a set of data points as compiled by an exemplary embodiment of the present invention.

FIG. 7 illustrates raw reactionary feedback data for the first 30 time increments of a survey for one participant, and the resulting reactionary feedback as extrapolated by data compiler 48. As shown in FIG. 7, the participant only moved slider control 72 at time markers 0, 12, 13, 14, 20, 21, 27, and 28. As such, for the first 30 time markers of the survey, only eight slider control positions were recorded. To generate a table of slider control positions for each time marker, data compiler 48 inputs the raw position data at each corresponding time marker and fills in the blanks by extrapolating the raw reactionary feedback, for example, by entering a position of 50 into the data table for each of the first 11 time increments, entering a position of 68 for time increments 14-19, etc. In so doing, data compiler 48 generates a complete set of reactionary feedback for a participant, where the complete set of reactionary feedback includes a slider control position for each time marker. By repeating this process for each participant, data compiler 48 generates a complete set of reactionary feedback for each participant. It will be appreciated that the time marker may represent any desired time increment, such as 0.5 second, 1 second, 5 seconds, etc. It will also be appreciated that data compiler 48 may generate the complete set of reactionary feedback using other means, e.g., interpolation.

After generating a complete set of reactionary feedback for each participant, data compiler 48 compiles the reactionary feedback to generate the survey results. For example, data compiler 48 may compile the reactionary feedback sets by averaging the slider control position for each time increment across all participants. Data compiler 48 may also categorize the survey results by averaging the reactionary feedback of particular categories of participants, such as those groups generated based on gender, age, ethnicity, participant preferences, etc. For example, data compiler 48 may categorize the results from a radio survey into the categories shown in Table 1. It will be appreciated that the list in Table 1 is exemplary and not exhaustive. In addition, data compiler 48 may compile the answers to the questions posed to the participants during the collecting phase according to any known means. For example, data compiler 48 may generate statistics results corresponding to how many participants said yes or no to a particular question. Like the slider control position data, the question answer data may also be categorized.

TABLE 1

| Category |
|---|
| Average across all surveyed listeners |
| Male listeners |
| Female listeners |
| Listeners aged 19-24 |
| Listeners aged 25-34 |
| Regular listeners |
| Occasional listeners |
| Hispanic listeners |

After data compiler 48 generates the survey results, the survey results are stored in any suitable storage medium, such as random access memory (RAM) and/or read-only memory (ROM) in study manager 44, SQL server 42, and/or viewer manager 50. According to one exemplary embodiment, the survey results are stored in SQL server 42. When a client is ready to view the survey results, viewer manager 50 retrieves the survey results from SQL server 42, formats the survey results, and controls interactive survey viewer 52 to display the formatted survey results. A client may control viewer 52 to display the compiled data in any desired fashion by inputting instructions to viewer manager 50 via a user interface (blocks 330 and 340 of FIG. 6). For example, the client may input instructions to the viewer manager 50 to display specific categorized survey results, such as female data and Hispanic data, on viewer 52. In addition, the client may input instructions to viewer manger 50 to display specific sections of the survey results on viewer 52 as described in further detail below. These features enable the client to customize the displayed survey results and to focus on particular areas of interest.

While not required, viewer manager 50 may control the viewer 52 to stream the survey multi-media synchronously with the survey results. The multi-media may be streamed from a multi-media data file stored in memory in the viewer manager 50. Alternatively, the multi-media may be streamed from a media server 44 in either LAN 40 or in WAN 20. For example, viewer manager 50 may synchronize a streamed video provided by media server 44 with the slider control position survey results. According to the present invention, this feature may be selectively activated or inactivated responsive to instructions input by the client.

Figure 8:
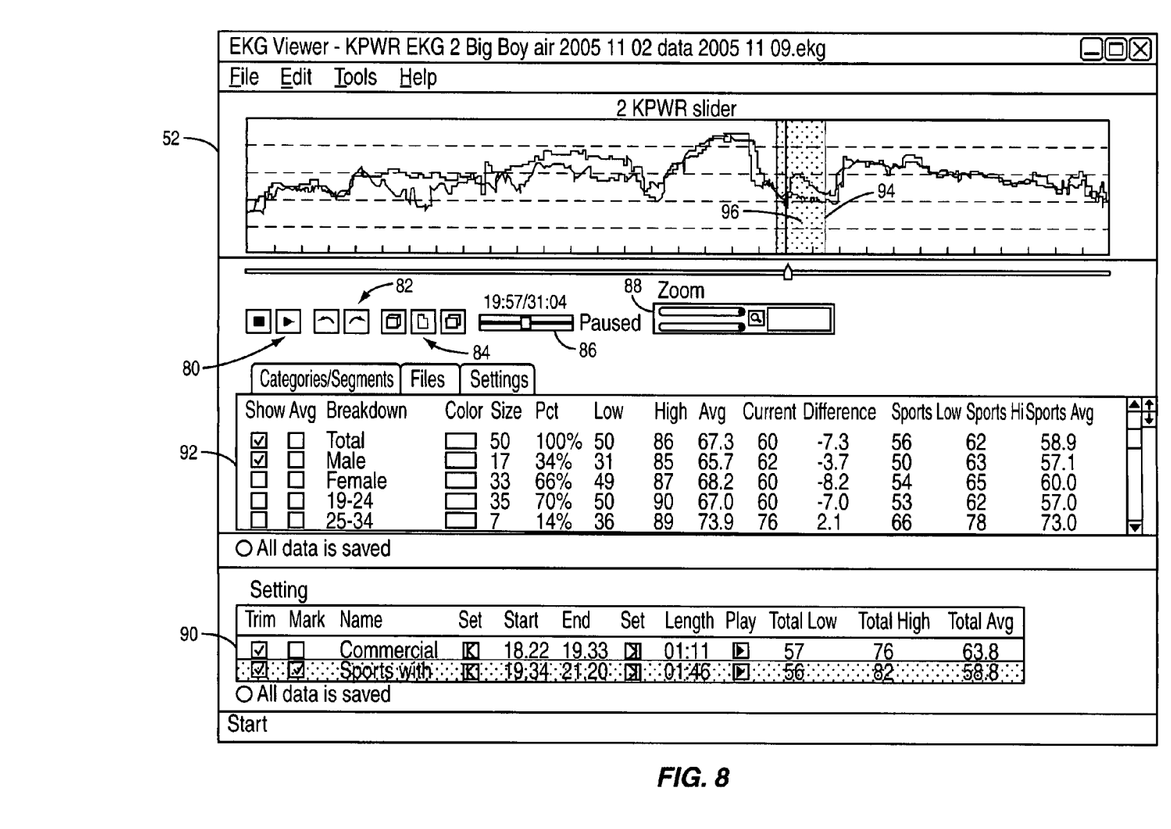
FIG. 8 illustrates a viewer according to an exemplary embodiment of the present invention.

FIG. 8 illustrates an exemplary viewer 52 displaying the compiled survey results from a radio show survey conducted with 50 participants. In viewer 52, a plot area shows the average slider control positions for a selected category of participants relative to the time increments associated with the survey multi-media, where tracking bar 96 tracks the streamed multi-media within the displayed survey results. While not explicitly shown, viewer 52 may also include the compiled question answers. As shown in FIG. 8, viewer 52 includes a number of viewer controls 80-92 that enable the client to control the displayed survey results. Using the controls shown in viewer 52 and any available input device, such as a mouse, stylus, keyboard, etc., the client may manipulate viewer 52 to:

play, pause, etc., the multi-media file using multi-media controls 80;

show the survey results for one or more of the categories using the controls in category block 92;

skip past potions of the survey results using skip controls 82 or by moving tracking bar 96;

zoom in on portions of the survey results using zoom controls 88 or other known zooming tools;

using display controls 84 to stream the multi-media data file while viewing the results and/or to have the survey results appear as the multi-media file streams;

highlight selected segments 90 using controls in segment block 90; and/or increase/decrease the volume of the multi-media file using volume controls 88.

The above list is exemplary and not exhaustive.

In addition to viewer controls 80-92, the client may control the settings 98 associated with viewer 52, where viewer manager 50 may customize the survey results displayed on viewer 52 based on these settings. For example, the client may define the skip interval used by skip controls 82, may define the trend parameters used to identify trends in the survey results, etc. Based on the trend settings, for example, viewer manager 50 may highlight survey results shown in category block 92 and/or segment block 90 in descriptive colors to indicate specific survey trends, such as if the survey results have a downward or upward trend.

As discussed above, data compiler 48 categorizes the survey results based on pre-defined categories. However, the present invention is not limited to these pre-defined categories; the client may dynamically define new categories while display 52 displays the survey results. For example, responsive to client input, viewer manager 50 may define a new category. Based on the newly defined category, viewer manager 50 and/or data compiler 48 compiles a new group of survey results. When the client selects the new category, viewer 52 displays the survey results for the new category.

Viewer manager 50 may also highlight a selected segment of the survey results when the client selects one of a pre-defined or client-specified segment category. For example, viewer manager 50 may identify different segments of the multi-media file that contain commercials, sports, news, weather, music, etc., or based on information about the multi-media segment, such as the entertainment personality hosting the segment. These segments may be defined in advance or may be defined by the client while the viewer 52 displays the results. Subsequently, the client may highlight a desired segment using the controls in segment block 90. As shown in FIG. 8, selecting the segment "Sports with Jeff Garcia" highlights the segment of survey results 94 corresponding to the "Sports with Jeff Garcia" portion of the streamed media.

The above-described invention enables organizations to conduct multi-media surveys at the participants' convenience and at a participant selected location. As such, the present invention enables organizations to conduct multi-media surveys in an efficient and cost-effective manner. In addition, because the survey results are synchronized with the surveyed multi-media, the collected survey results provide a highly accurate assessment of the participants' reaction to the surveyed multi-media.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

We claim:

1. A communication network configured to conduct a multi-media survey conducted based on streaming media from a multi-media data file to one or more survey participants, said communication network comprising:
    a network gateway configured to receive reactionary feedback via a wide area network from a plurality of participants, and to associate the received reactionary feedback with the corresponding participant, wherein the reactionary feedback comprises a recorded reaction that quantifies a reaction of a participant to the streamed media by corresponding a position of a movable reaction tool to the reaction of the participant as the participant moves the movable reaction tool between a minimum value and a maximum value, and wherein the reactionary feedback further comprises a time marker corresponding to each recorded reaction and representing a time of a recorded reaction relative to a time reference of the multi-media data file;
    a study manager configured to compile the reactionary feedback from the plurality of participants to generate survey results comprising a survey value between the minimum value and the maximum value at each of a plurality of time markers spanning at least some portion of the multi-media data file, wherein each survey value comprises a compilation of the reactionary feedback received for the corresponding time marker;
    a viewer configured to display synchronized survey results and multi-media data file; and
    a view manager configured to control the viewer responsive to user commands, wherein the viewer manager is further configured to synchronize the survey results with the multi-media data file to generate synchronized survey results and multi-media data by associating the survey results with the multi-media data having common time markers.

2. The communication network of claim 1 further comprising a recruit manager configured to select the plurality of participants from a plurality of survey candidates that accept a survey participation request.

3. The communication network of claim 1 wherein the study manager comprises a survey generator configured to generate a sequence of instructions for implementing the survey on a participant's personal communication device.

4. The communication network of claim 1 further comprising a media server configured to stream the media from the multi-media file to one or more of the plurality of participants via the wide area network during the survey.

5. The communication network of claim 1 wherein the viewer manager comprises at least one of a zoom control configured to zoom to a selected portion of the displayed synchronized survey results and multi-media data responsive to a user input, a skip control configured to skip to a selected portion of the displayed synchronized survey results and multi-media data responsive to user input, a pause control configured to pause the displayed synchronized survey results and multi-media data responsive to user input, and a volume control configured to control a volume of the streamed media responsive to user input.

6. The communication network of claim 1 wherein the viewer comprises a tracking marker that tracks a time location of the streamed media in the displayed synchronized survey results and multi-media data, and wherein the viewer manager is configured to control the tracking marker responsive to user control.

7. The communication network of claim 1 wherein the study manager comprises a survey generator configured to generate a sequence of instructions for implementing the survey on a participant's personal communication device, the communication network further comprising:
    a recruit manager configured to select the plurality of participants from a plurality of survey candidates that accept a survey participation request; and
    a media server configured to stream the media from the multi-media file to one or more of the plurality of participants via the wide area network during the survey.

8. The communication network of claim 7 wherein the viewer comprises a tracking marker that tracks a time location of the streamed media in the displayed synchronized survey results, and wherein the viewer manager is configured to control the tracking marker responsive to user control.

9. The communication network of claim 1 wherein the study manager comprises a data compiler configured to extrapolate reactionary feedback received from one or more participants to generate extrapolated reactionary feedback comprising a reactionary feedback value at each of a plurality of time markers in a predetermined set of time markers for each survey participant, and wherein the view manager is configured to generate the synchronized survey results and multi-media data by associating the extrapolated reactionary feedback corresponding to the time markers in the predetermined set of time markers with the corresponding time markers of the multi-media data file.

10. A method of compiling reactionary feedback obtained via a wide area network, the method comprising:
receiving reactionary feedback corresponding to a multi-media data file from a plurality of survey participants at a server via the wide area network, wherein the reactionary feedback associated with each survey participant comprises a plurality of reactionary values, each between a minimum value and a maximum value and each resulting from movement of a tool manipulated by the corresponding survey participant between the minimum value and maximum value and responsive to the survey participant's reaction to the multi-media data file at a corresponding time marker;
extrapolating the received reactionary feedback for one or more survey participants to generate extrapolated reactionary feedback comprising a reactionary feedback value at each of a plurality of time markers in a predetermined set of time markers for each survey participant;
synchronizing the extrapolated reactionary feedback data from a plurality of participants with the multi-media data file by associating the extrapolated reactionary feedback corresponding to the time markers in the predetermined set of time markers with the corresponding time markers of the multi-media data file; and
streaming the synchronized extrapolated reactionary feedback and multi-media data file to display the synchronized reactionary feedback and multi-media data file on a user interface of a network media device.

11. The method of claim 10 wherein extrapolating the reactionary feedback comprises populating a reactionary feedback table for each survey participant, wherein said reactionary feedback table includes the time markers in the predetermined set of time markers and the corresponding reactionary feedback values.

12. The method of claim 10 further comprising averaging the extrapolated reactionary feedback from a plurality of participants to generate average survey results.

13. The method of claim 10 further comprising averaging the extrapolated reactionary feedback from two or more participants corresponding to at least one survey category.

14. The method of claim 10 wherein streaming the synchronized extrapolated reactionary feedback and multi-media data file comprises streaming the synchronized extrapolated reactionary feedback and multi-media data file corresponding to one or more categories on the user interface.

15. The method of claim 10 further comprising manipulating the displayed synchronized extrapolated reactionary feedback and multi-media data file responsive to user control.

16. The method of claim 10 wherein extrapolating the reactionary feedback comprises populating a reactionary feedback table for each survey participant, wherein said reactionary feedback table includes the time markers in the predetermined set of time markers and the corresponding reactionary feedback values, the method further comprising averaging the extrapolated reactionary feedback from a plurality of participants to generate average survey results.

17. The method of claim 16 further comprising averaging the extrapolated reactionary feedback from two or more participants corresponding to at least one survey category, wherein synchronizing the extrapolated reactionary feedback and streaming the synchronized extrapolated reactionary feedback and multi-media data file comprises synchronizing the averaged and extrapolated reactionary feedback corresponding to at least one survey category with the multi-media data file and streaming the synchronized averaged and extrapolated reactionary feedback and multi-media data file to display survey results corresponding to one or more survey categories.

18. The method of claim 17 further comprising manipulating the displayed survey results responsive to user control.

19. A method of conducting a multi-media survey using a wide area network, the method comprising:
sending a multi-media data file to a plurality of survey participants;
receiving reactionary feedback from a plurality of participants via the wide area network, wherein the reactionary feedback for each survey participant comprises a plurality of reactionary values, each between a minimum value and a maximum value and each resulting from movement of a tool manipulated by the corresponding survey participant between the minimum value and maximum value and responsive to the survey participant's reaction to the multi-media data file at a corresponding time marker;
compiling the reactionary feedback from the plurality of participants to generate survey results comprising a survey value between the minimum value and the maximum value at each of a plurality of time markers spanning at least some portion of the multi-media data file, wherein each survey value comprises a compilation of the reactionary values received for the corresponding time marker; and
synchronously displaying the survey results on a viewer while streaming media from the multi-media data file to the viewer by displaying the survey values and sections of the multi-media data file having common time markers at the same time.

20. The method of claim 19 wherein displaying the survey results comprises displaying one or more sorted groups of the survey results, wherein the sorted groups are sorted based on at least one survey category, the method further comprising manipulating the displayed survey results responsive to user control.

21. The method of claim 19 wherein compiling the reactionary feedback further comprises extrapolating the reactionary feedback received from one or more participants to generate extrapolated reactionary feedback comprising a reactionary feedback value at each of a plurality of time markers in a predetermined set of time markers for each survey participant, and wherein synchronously displaying the survey results comprises synchronizing the extrapolated reactionary feedback from a plurality of participants by associating the extrapolated reactionary feedback corresponding to the time markers in the predetermined set of time markers with the corresponding time markers of the multi-media data file and streaming the synchronized extrapolated reactionary feedback and multi-media data file to display the synchronized reactionary feedback and multi-media data file.

22. The method of claim 19 wherein displaying the survey results comprises displaying one or more sorted groups of the survey results, wherein the sorted groups are sorted based on at least one survey category.

23. The method of claim 19 further comprising manipulating the displayed results responsive to user control.

24. The method of claim 23 wherein manipulating the displayed results comprises at least one of zooming to a selected portion of the displayed results responsive to a zoom control, skipping to a selected portion of the displayed results responsive to a skip control, pausing the displayed results responsive to a pause control, and controlling a volume of the streamed media responsive to a volume control.

25. The method of claim 23 wherein manipulating the displayed results comprises manipulating a tracking marker responsive to user control, wherein the tracking marker tracks a location of the streamed media in the displayed survey results.

26. A communication network configured to conduct a multi-media survey comprising:
- a network gateway configured to receive reactionary feedback via a wide area network from a plurality participants, wherein the network gateway is further configured to associate the received reactionary feedback with the corresponding participant, and wherein the reactionary feedback associated with each survey participant comprises a plurality of reactionary values, each between a minimum value and a maximum value and each resulting from movement of a tool manipulated by the corresponding survey participant between the minimum value and maximum value and responsive to the survey participant's reaction to the multi-media data foe; and
- a study manager configured to compile the reactionary feedback from the plurality of participants to generate the survey result, wherein the study manager comprises a data compiler configured to extrapolate reactionary feedback received from one or more participants to generate extrapolated reactionary feedback comprising a reactionary feedback value at each of a plurality of time markers in a predetermined set of time markers for each survey participant.

27. The communication network of claim 26 wherein the data compiler is further configured to average the extrapolated reactionary feedback from two or more participants to generate average survey results.

28. The communication network of claim 26 wherein the data compiler is further configured to generate average survey results for one or more survey categories based on the extrapolated reactionary feedback from two or more participants associated with the one or more survey categories.

29. The communication network of claim 28 wherein the one or more survey categories comprises at least one of a gender, age, interest, and media category.

30. The communication network of claim 28 wherein the media category comprises at least one of a sports, news, weather, and entertainment personality category.

* * * * *